United States Patent
Kinnamon et al.

[11] Patent Number: 5,131,669
[45] Date of Patent: Jul. 21, 1992

[54] BUMPER ASSEMBLY WITH RESILIENT BUMPER FOR SHOPPING CART

[75] Inventors: Kevin D. Kinnamon, Ft. Gibson; Ronald J. Jones, Muskogee, both of Okla.

[73] Assignee: Unarco Industries, Inc., Chicago, Ill.

[21] Appl. No.: 706,055

[22] Filed: May 28, 1991

[51] Int. Cl.5 .................... B62D 39/00; B62B 11/00
[52] U.S. Cl. .............................. 280/33.992; 293/123
[58] Field of Search ............... 280/33.991, 33.992, 280/33.995, 33.996, 33.997; 52/254, 288, 717.1, 718.1; 248/345.1; 293/1, 38, 117, 123

[56] References Cited

U.S. PATENT DOCUMENTS

| | | | |
|---|---|---|---|
| 3,195,912 | 7/1965 | Howard et al. | 280/33.992 |
| 3,813,111 | 5/1974 | Ruger | 280/33.992 X |
| 4,012,878 | 3/1977 | Ellingson | 52/288 |
| 4,201,359 | 5/1980 | Buslow | 248/345.1 |
| 4,600,204 | 7/1986 | Badger | 280/33.992 |
| 4,883,281 | 11/1989 | Waterman | 280/33.992 |
| 5,020,811 | 6/1991 | Ondrasik | 280/33.993 |
| 5,074,570 | 12/1991 | Ferris et al. | 280/33.995 |

FOREIGN PATENT DOCUMENTS

| | | | |
|---|---|---|---|
| 0382866 | 8/1990 | European Pat. Off. | 280/33.995 |
| 1182410 | 11/1964 | Fed. Rep. of Germany | 52/288 |
| 2602653 | 2/1988 | France | 248/345.1 |

OTHER PUBLICATIONS

Drawing No. 1-1295-515 dated Jun. 8, 1976 of United Steel & Wire Division.
Brochure of Kart-Gard, "A New One-Piece Full Length Vertical Shopping Cart Bumper", undated.
Unarco Commercial Products Drawing No. B-P-6001327 dated Feb. 6, 1987.
Unarco Commercial Products Drawing No. C-P-600143 dated Jun. 20, 1989.
Unarco Commercial Products Drawing No. B-P-6001264 dated Nov. 14, 1989.

*Primary Examiner*—Andres Kashnikow
*Assistant Examiner*—Brian L. Johnson
*Attorney, Agent, or Firm*—Dressler, Goldsmith, Shore, Sutker & Milnamow, Ltd.

[57] ABSTRACT

A bumper assembly for a shopping cart having a wire basket with horizontal wires bent so as to define a front corner of the basket. The assembly comprises a resilient, extruded, polymeric bumper having front, back, and side apertures extending longitudinally through the bumper, which is slotted so as to accommodate such wires at the front corner. The assembly comprises a pin extending through the back aperture with an interference fit so as to confine such wires between the pin and a front wall of the bumper. The front wall, which partly bounds the front aperture, is spaced from such wires when the front wall is unstressed. The front and side apertures lend enhanced cushioning ability to the bumper, which can yield in flexure, as well as in compression.

9 Claims, 1 Drawing Sheet

U.S. Patent
July 21, 1992
5,131,669
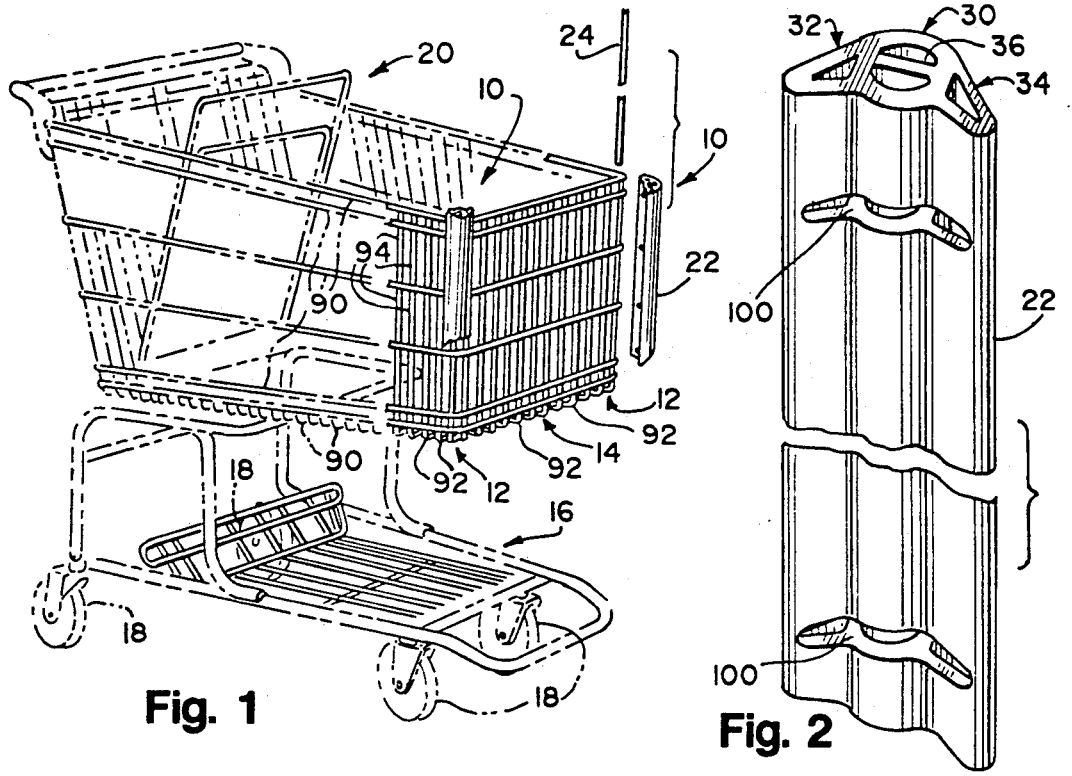
Fig. 1
Fig. 2
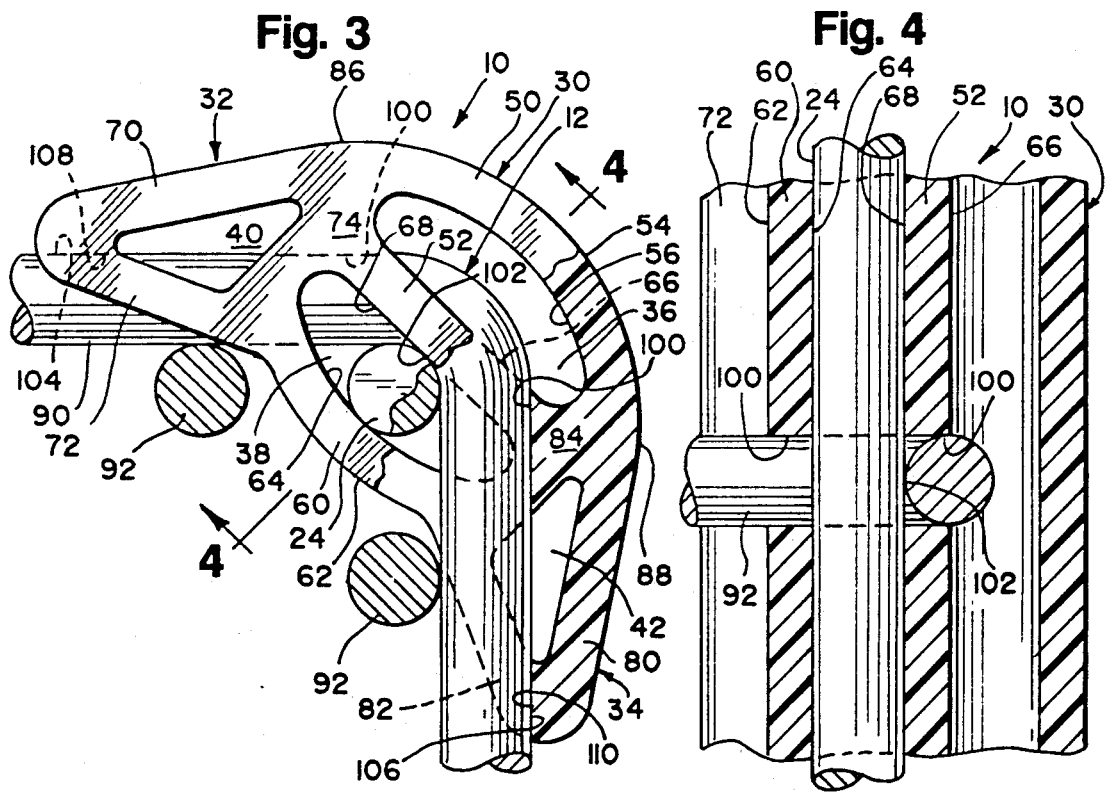
Fig. 3
Fig. 4

BUMPER ASSEMBLY WITH RESILIENT BUMPER FOR SHOPPING CART

TECHNICAL FIELD OF THE INVENTION

This invention pertains to a resilient bumper for a shopping cart and to a bumper assembly comprising such a bumper and a pin for attaching it. The bumper has elongate apertures extending longitudinally through the bumper and enhancing its cushioning ability by enabling the bumper to yield by flexure of at least one wall portion of the bumper, as well as by compression.

BACKGROUND OF THE INVENTION

A shopping cart of a type in widespread use has a wire basket, which is mounted on a wheeled chassis. The wire basket is made from welded wires, which include generally horizontal wires that are bent so as to define two front corners of the wire basket.

Commonly, so as to avert damage to store fixtures, automobiles in parking lots, and other objects that may be accidentally bumped by a shopping cart of the type noted above, bumpers are attached to the front corners of the wire basket of the shopping cart. These bumpers may be relatively short bumpers, which may be employed in pairs along the front corners of the wire basket, or relatively long, so-called "full length" bumpers, which may cover substantially all of such corners. It is known to make such bumpers from a resilient, polymeric material, which can yield by compression. Examples of relatively long bumpers are disclosed in Badger U.S. Pat. No. 4,600,204 and in Waterman U.S. Pat. No. 4,883,281.

Although some of the bumpers known heretofore may be generally satisfactory, it would be highly desirable to provide a shopping cart bumper having enhanced cushioning ability, as compared to shopping cart bumpers known heretofore.

SUMMARY OF THE INVENTION

According to a first aspect of this invention, a novel bumper is provided for a shopping cart. The bumper, which is elongate and which is extruded or made otherwise of a resilient material, has wall portions coacting with other portions of the bumper to define a plurality of elongate apertures extending substantially through the bumper. Each aperture is surrounded laterally by solid portions of the bumper but may be open-ended. It is preferred that the elongate apertures extend completely through the bumper in substantially parallel directions. The bumper has a middle section with at least one of the apertures extending at least substantially through the middle section and two side sections extending laterally and backwardly from the middle section with at least one of the apertures extending at least substantially through each side section.

At least some of the elongate apertures enable the bumper to yield by flexure of at least one wall portion of the bumper, in a manner tending to collapse at least one of the apertures, as well as by compression of the resilient material of the bumper. Thus, as compared with shopping cart bumpers known heretofore, the bumper tends to be perceptibly softer and to offer superior protection against damage to store fixtures, automobiles in parking lots, and other objects that may be accidentally bumped by a shopping cart.

According to a second aspect of this invention, a bumper assembly having novel features is provided for a shopping cart having a wire basket with a plurality of wires defining a front corner of the wire basket. The basket assembly comprises an elongate bumper made of a resilient material and a pin for attaching the bumper to the front corner of the wire basket. The bumper may be similar to the bumper described above in connection with the first aspect of this invention.

In the bumper assembly, the bumper has wall portions coacting with other portions of the bumper to define a plurality of elongate apertures extending at least substantially through the bumper, each aperture being surrounded laterally by solid portions of the bumper. The bumper has a middle section having at least two of the apertures, namely a front aperture and a back aperture, and has two side sections extending laterally and backwardly from the middle section. The bumper is slotted to accommodate at least one of the wires. The pin is adapted to extend at least substantially through the back aperture with an interference fit so as to confine at least one of the wires, as accommodated where the bumper is slotted, between the pin and one of the wall portions. The front aperture enables the bumper to yield by flexure of at least one wall portion of the bumper, in a manner tending to collapse the front aperture, as well as by compression of the resilient material of the bumper.

Preferably, each side section has a side aperture extending at least substantially through such side section. Each side aperture enables the bumper to yield by flexure of at least one wall portion of the bumper, in a manner tending to collapse such side aperture, as well as by compression of the resilient material of the bumper. It is preferred that the front, back, and side apertures extend completely through the bumper in substantially parallel directions.

Since the bumper of the bumper assembly described above in connection with the second aspect of this invention may be similar to the bumper described above in connection with the first aspect of this invention, the bumper of such assembly offers similar advantages over shopping cart bumpers known heretofore.

These and other objects, features, and advantages of this invention are evident from the following description of a preferred embodiment of this invention with reference to the accompanying drawings.

BRIEF DESCRIPTION OF THE DRAWINGS

FIG. 1 is a perspective view of front portions of the wire basket of a shopping cart of the type noted above, as provided with a bumper assembly according to this invention at each of the front corners of such basket. One such assembly is shown as broken away at its lower end. The other assembly is shown in an exploded representation. Other portions of the wire basket and other elements of the shopping cart are shown in phantom lines.

FIG. 2, on an enlarged scale, is a partly broken away, perspective view of a resilient, extruded, polymeric bumper, as used in each of the bumper assemblies of FIG. 1.

FIG. 3, on a further enlarged scale, is an end view of one such bumper, as attached by an elongate rod to one of the front corners of the wire basket with portions of the bumper shown in cross-section.

FIG. 4 is a sectional view taken along line 4—4 of FIG. 3, in a direction indicated by arrows.

DETAILED DESCRIPTION OF PREFERRED EMBODIMENT

As shown in FIG. 1, two bumper assemblies 10 are shown, each of which exemplifies a preferred embodiment of this invention. Each bumper assembly 10 is associated with a respective one of two front corners 12 of a wire basket 14, which is mounted on a chassis 16 having four wheeled casters 18, in a shopping cart 20 of the type noted above. Except as disclosed herein, the shopping cart 20 is similar to shopping carts available commercially from Unarco Commercial Products, supra. One bumper assembly 10 is shown fragmentarily, as attached to one such corner 12. The other assembly 10 is shown in an exploded condition, as about to be similarly attached to the other corner 12. Each bumper assembly 10 comprises a resilient, extruded, polymeric bumper 22 and an elongate pin 24 for attaching the bumper 22 to the associated corner 12. Each bumper 22 has apertures extending longitudinally therethrough, as described below, some of which enhance the cushioning ability of such bumper 22.

Each bumper 22 is extruded from a resilient, polymeric material. Polyurethane having a Shore A durometer in a range from about 55 to about 75 is a preferred material. Other resilient, polymeric materials may be alternatively used, such as poly(vinyl chloride). A representative bumper 22 and the pin 24 attaching it to the associated corner 12 of the wire basket 14 are shown in FIGS. 2, 3 and 4 and are described below.

The bumper 22 has a middle section 30 and two side sections 32, 34, which extend laterally and backwardly from the middle section 30. The bumper 22 has a front aperture 36 extending longitudinally through the middle section 30, a back aperture 38 extending longitudinally through the middle section 30, a side aperture 40 extending longitudinally through the side section 32, and a side aperture 42 extending longitudinally through the side section 34. The apertures 36, 38, 40, 42 extend completely through the bumper 22 in substantially parallel directions. Each of the apertures 36, 38, 40, 42 is surrounded laterally by solid portions of the bumper 22. The bumper 22 is symmetrical about a plane through line 4—4 of FIG. 3.

The front aperture 36 is substantially lenticular (with two rounded ends) in cross-section, as shown in FIG. 3, and is bounded partly by a front wall portion 50 of the bumper 22 and partly by an inner wall portion 52 of the bumper 22. The front wall portion 50, which is curved, defines an exterior surface 54, which is convex at least when the front wall portion 50 is unstressed, and an interior surface 56, which is concave at least when the front wall portion 50 is unstressed. The back aperture 38 is substantially lenticular in cross-section, as shown in FIG. 3, and is bounded partly by the inner wall portion 52 and partly by a back wall portion 60 of the bumper 22. The back wall portion 60 defines an exterior surface 62, which is convex, and an interior surface 64, which is concave. The inner wall portion 52, which separates the front aperture 36 and the back aperture 38, defines two opposite, substantially planar surfaces 66, 68, which face the front aperture 36 and the back aperture 38, respectively.

Each of the side apertures 40, 42, is substantially triangular (with three rounded apexes) in cross-section, as shown in FIG. 3. The side aperture 40 of the side section 32 is bounded partly by a side wall portion 70 of the bumper 22, partly by a back wall portion 72 of the bumper 22, and partly by an interior portion 74 dividing the side section 32 from the middle section 30. The side aperture 42 of the side 34 is bounded partly by a side wall portion 80 of the bumper 22, partly by a back wall portion 82 of the bumper 22, and partly by an interior portion 84 dividing the side section 42 from the middle section 30. Each of the back wall portions 72, 82, extends in a substantially lateral direction from the back wall portion 60.

According to known practice, the wire basket 14 normally comprises five to seven substantially horizontal, heavy gauge wires 90, which are bent in a manner shown in FIG. 3 so as to define each of the front corners 12 of the wire basket 14. Each of the front corners 12 is rounded, as shown in FIG. 3. Additionally, the wire basket 14 comprises numerous additional, light gauge wires 92, which have generally vertical portions 94 that are welded to the substantially horizontal wires 90, and to each other, in a known manner. As shown in FIG. 3, the vertical portions 94 of two such wires 92 are spaced from each front corner 12, so that there is no interference between such vertical portions 94 and the bumper assembly 10 attached at such front corner 12. Other features of the wire basket 14 are conventional.

The bumper 22 associated with each front corner 12 of the wire basket 14 is formed so as to have four transverse slots 100 (two shown in FIG. 2) extending through its back wall portions 60, 72, 82, through its inner wall portion 52, and into its interior portions 74, 84, so as to accommodate four of the substantially horizontal wires 90 where the four wires 90 are bent so as to define such front corner 12. Thus, the bumper 22 covers substantially all of such front corner 12, except for the uppermost and lowermost wires 90.

When the bumper 22 is attached to such front corner 12, the bumper 22 is positioned so that the four wires 90 noted above extend into the respective slots 100, and into the front aperture 36 of the bumper 22, as shown in FIG. 3. Thereupon, the pin 24 is pushed through the back aperture 38, in such manner that the pin 24 confines the selected wires 90 between the pin 24 and the front wall portion 50. The pin 24 is sized so as to have an overall length equal approximately to the overall length of the bumper 22, and so as to have an interference fit in the back aperture 38, in which the pin 24 is confined between the back wall portion 60 and the inner wall portion 52. Although there is no need for the pin 24 to have an enlarged head at its upper end, such a head (not shown) may be optionally provided.

As shown in FIGS. 3 and 4, the front wall portion 50 is spaced from the four wires 90 noted above when the front wall portion 50 is unstressed, so that the bumper 22 can yield by flexure of the front wall portion 50, as well as by compression of the resilient material of the bumper 22, if the bumper 22 strikes a solid object (not shown) at the front wall portion 50. Also, each side wall portion is spaced from the same wires 90 when such side wall portion is unstressed so that the bumper 22 can yield by flexure of such wall portion, as well as by compression of the flexible material of the bumper 22, if the bumper 22 strikes such an object at such side wall portion. Moreover, the respective apertures of the bumper 22 are shaped so that the bumper 22 can yield by flexure of adjacent wall portions of the bumper 22, as well as by compression of the resilient material of the bumper 22, if the bumper 22 strikes such an object at a location between the front wall portion 50 and either of the side wall portions 70, 80, e.g., at a location 86 on the exterior surface 54 where the front wall portion 50 merges with the side wall portion 70 or at a location 88 thereon where the front wall portion 50 merges with the side wall portion 80.

As shown also in FIGS. 3 and 4, the pin 24 conforms generally to and bears against inside surfaces 102 of the respective wires 90 at the front corner 12, while outside surfaces 104, 106, of the wires 90 bear against the side sections 32, 34, at inside surfaces 108, 110, of the slots 100. Also, the side walls 70, 80, of the bumper 22 may be slightly stressed such that the side sections 32, 34, bear firmly against the pin 24.

As compared with shopping cart bumpers known heretofore, the bumper 22 tends to be perceptibly softer and to offer superior protection against damage to store fixtures, automobiles in parking lots, and other objects that may be accidentally bumped by a shopping cart, such as the shopping cart 20 as shown in FIG. 1. Moreover, the bumper 22 has enhanced cushioning ability, as compared to shopping cart bumpers known heretofore that yield by compression but not by flexure.

Various modifications may be made in the bumper assembly disclosed herein without departing from the scope and spirit of this invention.

We claim:

1. A bumper assembly for a shopping cart having a wire basket with a plurality of wires defining a front corner of the wire basket, the bumper assembly comprising an elongate bumper made of a resilient material, the bumper having wall portions coacting with other portions of the bumper to define a plurality of elongate apertures extending substantially through the bumper, each aperture being surrounded laterally by solid portions of the bumper, the bumper having a middle section with at least two of the apertures extending at least substantially through the middle section, providing a front aperture and a back aperture, the bumper having two side sections extending laterally and backwardly from the middle section, the bumper being slotted to accommodate at least one of the wires, and means for attaching the bumper to the front corner of the wire basket, said means comprising a pin adapted to extend at least substantially through the back aperture with an interference fit so as to confine said at least one of the wires accommodated by the bumper where the bumper is slotted, between the pin and one of the wall portions, wherein the front aperture enables the bumper to yield by flexure of at least one of the wall portions of the bumper, thereby tending to collapse the front aperture, as well as by compression of the resilient material of the bumper.

2. The bumper assembly of claim 1 wherein each side section has a side aperture extending at least substantially through said side section, and wherein each side aperture enables the bumper to yield by flexure of at least one of the wall portions of the bumper, thereby tending to collapse such side aperture, as well as by compression of the resilient material of the bumper.

3. The bumper assembly of claim 2 wherein the front, back, and side apertures extend in substantially parallel directions.

4. The bumper assembly of claim 2 wherein the front, back, and side apertures extend completely through the bumper.

5. The bumper assembly of claim 2 wherein the front, back, and side apertures extend completely through the bumper in substantially parallel directions.

6. The bumper assembly of claim 2 wherein the wall portions include a front wall portion, an inner wall portion, and a back wall portion, the front aperture being bounded partly by the front wall portion and partly by the inner wall portion, the back aperture being bounded partly by the back wall portion and partly by the inner wall portion, the back and inner wall portions having at least one slot to accommodate at least one of the wires defining the front corner of the wire basket, the pin confining said at least one of the wires between the pin and the front wall when the bumper is attached to the front corner of the wire basket.

7. The bumper assembly of claim 6 wherein the back and inner wall portions have a plurality of similar slots to accommodate a plurality of the wires defining the front corner of the wire basket.

8. The bumper assembly of claim 6 wherein each side aperture is bounded partly by a wall portion extending from the front wall portion and partly by a wall portion extending from the back wall portion and having said at least one slot to accommodate said at least one of the wires defining the front corner of the wire basket.

9. The bumper assembly of claim 7 wherein each side aperture is bounded partly by a wall portion extending from the front wall portion and partly by a wall portion extending from the back wall portion and having a plurality of similar slots to accommodate said plurality of the wires defining the front corner of the wire basket.

* * * * *